United States Patent Office 2,911,398
Patented Nov. 3, 1959

2,911,398

POLYMER HYDROPEROXIDES

Edwin J. Vandenberg, Wilmington, Del., assignor to Hercules Powder Company, Wilmington, Del., a corporation of Delaware No Drawing. Application December 31, 1952
Serial No. 329,131

4 Claims. (Cl. 260—93.5)

This invention relates to new hydroperoxides and, more particularly, to polymers containing hydroperoxide groups attached to carbon of the polymer chain and the preparation of such polymer hydroperoxides.

In accordance with this invention, it has been found that polymers containing hydroperoxy groups may be produced by the oxidation of a polymer containing an oxidizable hydrogen atom attached to a carbon of the polymer chain with an oxygen-containing gas.

Any polymer containing an oxidizable hydrogen attached to a carbon of the polymer chain may be oxidized in accordance with this invention to produce a polymer containing hydroperoxide groups. Hydrogens capable of being so oxidized to hydroperoxide groups are most commonly hydrogens attached to tertiary carbons in the polymer chain, but some hydrogens attached to secondary carbons in the polymer chain may also be oxidized to hydroperoxy groups. Thus, any polymer of a monomer containing a vinyl or vinylene group will contain tertiary hydrogens attached to the carbon of the polymer chain, which hydrogens may be oxidized to hydroperoxy groups. While the homopolymers of vinylidene monomers such as methyl methacrylate, methacrylamide, methacrylonitrile, vinylidene chloride, etc., do not contain oxidizable hydrogens, copolymers of such monomers with vinyl or vinylene comonomers will contain hydrogen attached to a tertiary carbon of the polymer chain and are capable of being oxidized in accordance with this invention to polymer hydroperoxides.

Exemplary of the polymers containing hydrogen attached to a tertiary carbon of the polymer chain which may be oxidized to hydroperoxy groups are the polymers and copolymers of vinyl and vinylene monomers such as ethylene, propylene, butylene, styrene, ortho-, meta-, and para-methyl styrenes, p-chlorostyrene, p-nitrostyrene, p-acetylstyrene, vinyl pyridine, vinyl naphthalene, vinyl ethers such as the vinyl ethers of methanol, ethanol, butanol, etc., vinyl esters such as vinyl acetate, vinyl propionate, etc., allyl acetate, methyl vinyl ketone, methyl acrylate, acrylonitrile, acrylamide, etc. Frequently it is desirable to oxidize a copolymer of these monomers rather than the homopolymer as, for example, in the case of such monomers as acrylonitrile, acrylamide, methyl acrylate, vinyl chloride, etc., their copolymers with a styrene, vinyl pyridine, etc., usually being more easily oxidized. In the same way, copolymers of monomers, which by themselves would not form a homopolymer containing a tertiary hydrogen, may be oxidized to a hydroperoxide. Thus, copolymers of methacrylamide, methacrylonitrile, vinylidene chloride, isobutylene, methyl isopropenyl ketone, etc., with any of the above monomers as, for example, a styrene, vinyl pyridine, etc., may be oxidized to a hydroperoxide. Another group of polymers that may be oxidized to hydroperoxides in accordance with this invention are copolymers of one of the above monomers such as styrene, etc., with a vinylene monomer which does not polymerize by itself but will copolymerize with a vinyl, etc., monomer as for example maleic anhydride, ethyl fumarate, etc.

The preparation of polymer hydroperoxides having hydroperoxide groups attached to carbon of the polymer chain in accordance with this invention will be illustrated by the following examples as will applications of these new products.

*Examples 1 and 2*

Four hundred parts of a commercial polystyrene (a 1% solution in benzene having a specific viscosity of 1.47) was dissolved in 1600 parts of cumene and to this solution were added 20 parts of calcium hydroxide and 26.7 parts of 75% cumene hydroperoxide. Oxygen was bubbled through this reaction mixture held at 90° C. at the rate of about 4 cc./sec. until the iodometric hydroperoxide analysis indicated 30% cumene hydroperoxide (72 hours). The reaction mixture was then filtered to remove the insolubles and the polystyrene hydroperoxide was recovered by pouring the filtered solution into methanol with agitation. It was washed twice with methanol and then dried at room temperature in vacuo. In order to completely remove the cumene hydroperoxide from the polystyrene hydroperoxide, it was redissolved in benzene (20% concentration) and reprecipitated in methanol three times. The product so obtained on analysis was found to be 1.2% substituted with hydroperoxide groups and had a specific viscosity (1% benzene solution) of 0.43.

In this and the following examples the hydroperoxide content of the polymer will be expressed as "percent substitution" or "percent substituted," i.e., the number of hydroperoxide groups per 100 oxidizable monomer units in the polymer.

A polystyrene hydroperoxide containing a lower percentage of hydroperoxide groups was prepared as above but the oxidation was stopped at about 10% cumene hydroperoxide, whereby there was obtained a polystyrene hydroperoxide which was 0.4–0.5% substituted and which had a specific viscosity (1% benzene) of 1.02.

Grafted polymers were prepared from the polystyrene hydroperoxide of 0.5% substitution and acrylamide and the polystyrene hydroperoxide of 1.2% substitution and methyl acrylate according to the following polymerization formula:

|  | Parts |
|---|---|
| Polymer hydroperoxide | 100 |
| Monomer | 100 |
| Benzene | 1000 |
| Ferric acetylacetonate | 0.01 |
| Benzoin | 1.0 |
| Triethylamine | 0.2 and 0.5 respectively |

In each case the reaction mixture was heated for 22 hours at 40° C.

The solution of the grafted polymer obtained from the polystyrene hydroperoxide and acrylamide was very viscous and turbid and a total solids indicated that about 92% of the acrylamide had polymerized. The grafted polymer was precipitated by pouring it into well-agitated methanol. It was then collected by filtration and washed with methanol and then with water. On analysis it was found to contain 6.2% nitrogen which corresponds to 31% acrylamide. This polystyrene-acrylamide graft polymer was insoluble in water, benzene (somewhat swollen), dimethylformamide and formamide.

The solution of the grafted polymer obtained from polystyrene hydroperoxide and methyl acrylate was clear and viscous and a total solids indicated that about 86% of the methyl acrylate had polymerized. It was precipitated and purified as above. It contained 16.3% oxygen which corresponds to 44% methyl acrylate. This polystyrene-methyl acrylate graft polymer was soluble in benzene and had a specific viscosity (1% benzene) of 0.64.

*Example 3*

Oxygen was bubbled through a mixture of 30 parts of a commercial polyethylene (mol. wt.=7000) and 120 parts of tert-butyl benzene containing 1.5 parts of dicumene peroxide initiator at 110° C. for 46 hours. Analysis showed that hydroperoxide groups had formed to the extent of 0.46% substitution. The product was precipitated by adding the hot reaction mixture to 1500 parts of methanol with agitation. It was separated by filtration, washed with methanol, dried, and then further purified by dissolving it in 135 parts of hot benzene and reprecipitating by pouring the hot solution into 1500 parts of methanol. It was again separated by filtration, washed twice with methanol, and dried. On analysis, it was found to be 0.26% substituted.

A graft polymer was prepared from this polyethylene hydroperoxide and vinyl acetate using the following redox polymerization formula:

|  | Parts |
| --- | --- |
| Polyethylene hydroperoxide | 25 |
| Vinyl acetate | 100 |
| Benzene | 250 |
| Ferric acetylacetonate | 0.005 |
| Benzoin | 0.25 |
| Triethylamine | 0.12 |

The polymerization was carried out at 65° C. for 72 hours. A 54% conversion of the vinyl acetate was obtained. The reaction mixture was very viscous.

*Example 4*

Oxygen was bubbled through a solution of 10 parts of polypropylene (specific viscosity, 1% benzene,=0.17) in 20 parts of tert-butyl benzene containing 1.0 part of dicumene peroxide and 0.20 part of sodium carbonate at 110° C. for 43 hours. The product was recovered by precipitating it in 300 parts of methanol. The taffy-like solid was vacuum-dried for 19 hours at room temperature. On analysis it was found to be 0.15% substituted.

A graft polymer was prepared from this polypropylene hydroperoxide and methyl acrylate using the same polymerization formula as in Example 3 except for the substitution of this hydroperoxide and monomer. The polymerization was carried out at 40° C. for 17.5 hours. The methyl acrylate was 17% polymerized.

In accordance with this invention, a polymer hydroperoxide having hydroperoxide groups attached only to carbon of the polymer chain may be prepared by oxidizing a polymer or copolymer having oxidizable hydrogen attached only to carbon of the polymer chain by intimately contacting the polymer in liquid phase with a gas containing free oxygen. As may be seen from the foregoing examples, the oxidation of the polymer with a gas containing free oxygen to the polymer hydroperoxide may be carried out under a variety of conditions. Usually the oxidation is carried out by passing the oxygen-containing gas through a solution of the polymer in a suitable solvent. Preferably the solvent will be one that is inert under the reaction conditions, as, for example, benzene, chlorobenzene, tert-butylbenzene, normal aliphatic hydrocarbons such as n-pentane, n-hexane, n-heptane, etc. Water is a suitable solvent for the oxidation of water-soluble polymers. The oxidation may also be carried out by a suspension or emulsion technique, i.e., passing the oxygen-containing gas into a suspension or emulsion of the polymer in an aqueous phase. This method is particularly advantageous in the case of water-insoluble polymers where the viscosity of an organic solution of the polymer would be too great to handle conveniently otherwise. However, the oxidation may be carried out in liquid phase without the use of a solvent or water if the polymer is liquid at the temperature at which the oxidation is carried out.

The oxidation may also be carried out by a co-oxidation procedure, i.e., using as a solvent a compound which is not inert and which will itself be oxidized, as, for example, cumene, diisopropylbenzene, p-menthane, etc. This co-oxidative method is frequently desirable in the case of polymers that are not as readily oxidized and where the second hydroperoxide formed is a useful by-product.

It is frequently desirable to add an initiator, particularly in the case of polymers that are difficult to oxidize. With polymers that are easily oxidized, an initiator may be used to speed up the oxidation. Any free radical-generating agent may be used as an initiator for the oxidation, as, for example, hydroperoxides such as cumene hydroperoxide, p-menthane hydroperoxide, diisopropylbenzene monohydroperoxide, etc., peroxides such as dicumene peroxide, benzoyl peroxide, diacetyl peroxide, etc., persulfates and peroxycarbonates such as sodium persulfate, diethyl peroxydicarbonate, etc., and nitrogen compounds such as azo-bis(isobutyronitrile), etc.

A base stabilizer is preferably added to the oxidation reaction mixture but is not required. Exemplary of the bases that may be used are calcium hydroxide, sodium bicarbonate, sodium carbonate, calcium carbonate, ammonia, organic amines such as methylamine, ethylamine, trimethylamine, etc. These bases may be used with or without an aqueous phase present. In some cases a gaseous base such as ammonia or a soluble base may be preferred in order to eliminate filtering a viscous polymer solution or separating an aqueous phase from a viscous polymer solution.

Any gas containing free oxygen may be used to carry out the oxidation, as, for example, oxygen, air, or any mixtures of oxygen and nitrogen or other inert gases. The process may be operated at atmospheric or superatmospheric pressure and as a batch or continuous process. The temperature at which the oxidation is carried out will depend upon the polymer being oxidized, the method being used, etc., but, in general, will be within the range of from about 20° C. to about 200° C., and preferably from about 60° C. to about 140° C.

The extent to which the oxidation is carried out will depend upon the number of hydroperoxide groups desired in the polymer. The amount of hydroperoxide groups introduced may be varied from about 0.1 to about 80% of the theoretical value. Hydroperoxide groups may be introduced into polymers of any molecular weight as, for example, from a polymer of about 20 monomer units up to a polymer of many thousand monomer units.

The isolation of the polymer hydroperoxide will, of course, depend upon the oxidation procedure used. If the oxidation was carried out in an inert solvent medium, the polymer hydroperoxide may be precipitated by pouring the solution into a nonsolvent for the hydroperoxide or by evaporation of the solvent by distillation, etc. If the oxidation was carried out in an aqueous phase system, the polymer hydroperoxide may be removed by filtration if it is insoluble therein, or it may be extracted with a water-immiscible solvent for the hydroperoxide. Many other methods of separating the polymer hydroperoxide are equally operable. If a co-oxidation process was used, it may be desirable to separate the second hydroperoxide from the polymer hydroperoxide. This may be done by pouring the reaction mixture into a solvent in which the second hydroperoxide is soluble but in which the polymer hydroperoxide is insoluble, whereby the latter is precipitated and may be removed by filtration, centrifugation, etc.

By the proper choice of the polymer being oxidized, it is possible to produce a polymer hydroperoxide having a wide range of physical properties. For example, polymer hydroperoxides of high or low molecular weight and with various solubility properties, etc., may be produced. Thus, a water-soluble polymer hydroperoxide can be prepared by copolymerizing a water-insoluble, but oxidizable, monomer such as styrene, p-methyl styrene, p-chlorostyrene, etc., with a monomer which will contribute water solubility or which can be saponified or altered to give water solubility. Exemplary of the monomers which will contribute water solubility to the polymer, and hence to the polymer hydroperoxide, are such monomers as maleic anhydride, sodium acrylate, sodium methacrylate, methyl acrylate, methyl methacrylate, acrylonitrile, diethylaminoethyl acrylate, carboxystyrene, styrene sulfonic acid, etc. Such copolymers as these may be prepared by free radical polymerization and then can be oxidized in aqueous solution to yield water-soluble polymer hydroperoxides.

The new polymer hydroperoxides of this invention have a wide variety of useful applications that make possible the introduction into a polymer molecule of such groups as ketone, alcohol, ethylene double bonds, peroxide, etc. groups. The polymer hydroperoxides of this invention containing hydroperoxy groups attached only to carbon of the polymer chain can readily be converted to alcohols by the chemical reduction of the hydroperoxide group, as, for example, with sodium sulfide, aluminum plus sodium hydroxide, base-catalyzed decomposition, etc., or by catalytic hydrogenation of the polymer hydroperoxide. Polymers containing ethylene double bonds may then be prepared from these alcohols. Polymeric ketones may be prepared from the polymer hydroperoxides by reacting the latter with metallic reducing agents such as ferrous sulfate, etc. It is also possible to introduce peroxide groups by the thermal decomposition of the hydroperoxide groups of the polymer hydroperoxide either with or without the presence of a metal catalyst. This procedure will increase the molecular weight of the final product and, under certain conditions, give cross-linked insoluble products. These peroxides are useful as free radical sources even though they are cross-linked insoluble products, because they become soluble on thermal decomposition. Peroxide groups may be introduced without any possibility of the products becoming cross-linked by reacting the polymer hydroperoxide with a tertiary alcohol, as, for example, tert-butyl alcohol or $\alpha,\alpha$-dimethylbenzyl alcohol, etc., in the presence of appropriate acid catalysts.

The polymer hydroperoxides of this invention may be used for the preparation of grafted polymers, as has been demonstrated in the foregoing examples. A wide variety of these grafted and extremely useful polymers may be produced and when produced from the polymer hydroperoxides, a much greater number of grafts per polymer unit can be obtained than by any other method of preparing grafted polymers.

The polymer hydroperoxides of this invention may also be used as initiators for polymerizations catalyzed by free radicals, as, for example, polymerization of vinyl compounds such as styrene, methyl methacrylate, butadiene-styrene, etc. The use of these polymer hydroperoxides for initiating free radical polymerization reactions makes it possible to modify and improve the properties of the polymers so obtained or to cross-link or vulcanize already formed polymers, as, for example, elastomers such as GR–S and butyl rubber, polyvinyl chloride, etc.

In this specification the term "tertiary hydrogen atom" means a hydrogen atom attached to a tertiary carbon atom.

What I claim and desire to protect by Letters Patent is:

1. A hydroperoxide of a polymer, said polymer being a hydrocarbon polymer containing at least about 20 monomer units and being essentially free from aliphatic unsaturation, said polymer being a polymer of at least one monoethylenically unsaturated hydrocarbon monomer, said polymer containing tertiary carbon atoms in the polymer chain and said hydroperoxide containing hydroperoxy groups attached to at least some of said tertiary carbon atoms in said polymer chain, there being from about 0.15 to about 1.2 hydroperoxy groups per 100 monomer units.

2. A polystyrene hydroperoxide containing from about 0.15 to about 1.2 hydroperoxy groups per 100 monomer units wherein the said hydroperoxy groups are attached only to carbon of the main polymer chain, said polystyrene containing at least about 20 monomer units.

3. A polyethylene hydroperoxide containing from about 0.15 to about 1.2 hydroperoxy groups per 100 monomer units wherein the said hydroperoxy groups are attached only to carbon of the main polymer chain, said polyethylene containing at least about 20 monomer units.

4. A polypropylene hydroperoxide containing from about 0.15 to about 1.2 hydroperoxy groups per 100 monomer units wherein the said hydroperoxy groups are attached only to carbon of the main polymer chain, said polypropylene containing at least about 20 monomer units.

References Cited in the file of this patent

UNITED STATES PATENTS

| | | |
|---|---|---|
| 2,461,966 | Davis | Feb. 15, 1949 |
| 2,525,628 | Young | Oct. 10, 1950 |

OTHER REFERENCES

Schmidt et al.: "Principles of High Polymer Theory and Practice," pages 522–525 (McGraw-Hill) (1948). Copy in Library.

Barnes et al.: J. Am. Chem. Soc., 72, 210–215 (1950), 260–610.